US012493254B2

(12) United States Patent
Ikeno

(10) Patent No.: US 12,493,254 B2
(45) Date of Patent: Dec. 9, 2025

(54) HEATING UNIT INCLUDING CLIP ENGAGED WITH STAY AND HOLDER SUPPORTING HEATER TO RESTRICT DETACHMENT OF HEATER FROM HOLDER

(71) Applicant: BROTHER KOGYO KABUSHIKI KAISHA, Nagoya (JP)

(72) Inventor: Yuichi Ikeno, Maibara (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 28 days.

(21) Appl. No.: 18/415,107

(22) Filed: Jan. 17, 2024

(65) Prior Publication Data

US 2024/0288809 A1 Aug. 29, 2024

(30) Foreign Application Priority Data

Feb. 28, 2023 (JP) ................................ 2023-030501

(51) Int. Cl.
*G03G 15/20* (2006.01)

(52) U.S. Cl.
CPC . *G03G 15/2053* (2013.01); *G03G 2215/2016* (2013.01)

(58) Field of Classification Search
CPC ........... G03G 15/2017; G03G 15/2053; G03G 2215/2003
See application file for complete search history.

(56) References Cited

U.S. PATENT DOCUMENTS

2020/0241456 A1* 7/2020 Kohama ................ G03G 15/80
2021/0341861 A1 11/2021 Uehara et al.
2022/0276593 A1 9/2022 Fujiwara

FOREIGN PATENT DOCUMENTS

JP 2020003689 A * 1/2020 ........... H01L 21/318
JP 2021173962 A 11/2021
JP 2022131654 A 9/2022

OTHER PUBLICATIONS

JP 2020003689 English machine translation, Kobayashi, Jan. 9, 2020 (Year: 2020).*

* cited by examiner

*Primary Examiner* — Thomas S Giampaolo, II
(74) *Attorney, Agent, or Firm* — Element IP, PLC

(57) ABSTRACT

A heating unit includes a heater, an endless belt circularly movable around the heater, a holder, a stay, and a clip. The heater includes a base plate elongated in a long-side direction, and a resistance heating element provided on the base plate. The endless belt has an inner circumferential surface in contact with a first surface of the heater. The holder supports a second surface of the heater. The stay supports the holder. The stay is positioned opposite the heater with respect to the holder. The clip nips the holder and the stay to retain the holder on the stay. The clip has a first part overlapping with the heater when viewed in a thickness direction of the base plate to restrict the heater supported by the holder from getting detached from the holder.

13 Claims, 10 Drawing Sheets

HEATING UNIT INCLUDING CLIP ENGAGED WITH STAY AND HOLDER SUPPORTING HEATER TO RESTRICT DETACHMENT OF HEATER FROM HOLDER

REFERENCE TO RELATED APPLICATIONS

This application claims priority from Japanese Patent Application No. 2023-030501 filed on Feb. 28, 2023. The entire content of the priority application is incorporated herein by reference.

BACKGROUND ART

Conventionally, there has been known a heating unit that includes a heater having a plate shape. In the conventional heating unit, a holder holding the heater is assembled to a stay and is arranged in an internal space defined by an inner peripheral surface of a fixing belt. For assembly of the holder to the stay, engaging portions of the stay and counter-engaging portions of the holder are engaged with each other.

SUMMARY

However, conceivably, the heater may be accidentally detached from the holder during assembly of the heating unit.

In view of the foregoing, it is an object of the present disclosure to provide a technology that can restrain accidental dropping of the heater from the holder during assembly of a heating unit.

In order to attain the above and other object, the present disclosure provides a heating unit including a heater, an endless belt, a holder, a stay and a clip. The heater has a first surface and a second surface opposite each other. The heater includes: a base plate elongated in a long-side direction and having a thickness defining a thickness direction orthogonal to the long-side direction; and a resistance heating element provided on the base plate. The endless belt is circularly movable around the heater. The endless belt has an inner peripheral surface in contact with the first surface of the heater. The holder supports the heater. The holder has a supporting surface supporting the second surface of the heater. The stay supports the holder. The stay is positioned opposite the heater with respect to the holder in the thickness direction. The clip nips the holder and the stay to retain the holder on the stay. The clip has a first part overlapping with the heater when viewed in the thickness direction to restrict the heater supported by the holder from getting detached from the holder.

With the above structure, since the clip holding the holder and the stay has the first part for restricting detachment of the heater from holder, dropping of the heater from the holder is less likely to occur during assembly of the heating unit to, for example, a frame of a fixing device.

DESCRIPTION

Hereinafter, an embodiment of the present disclosure will be described while referring to the accompanying drawings.

Figure 1A:
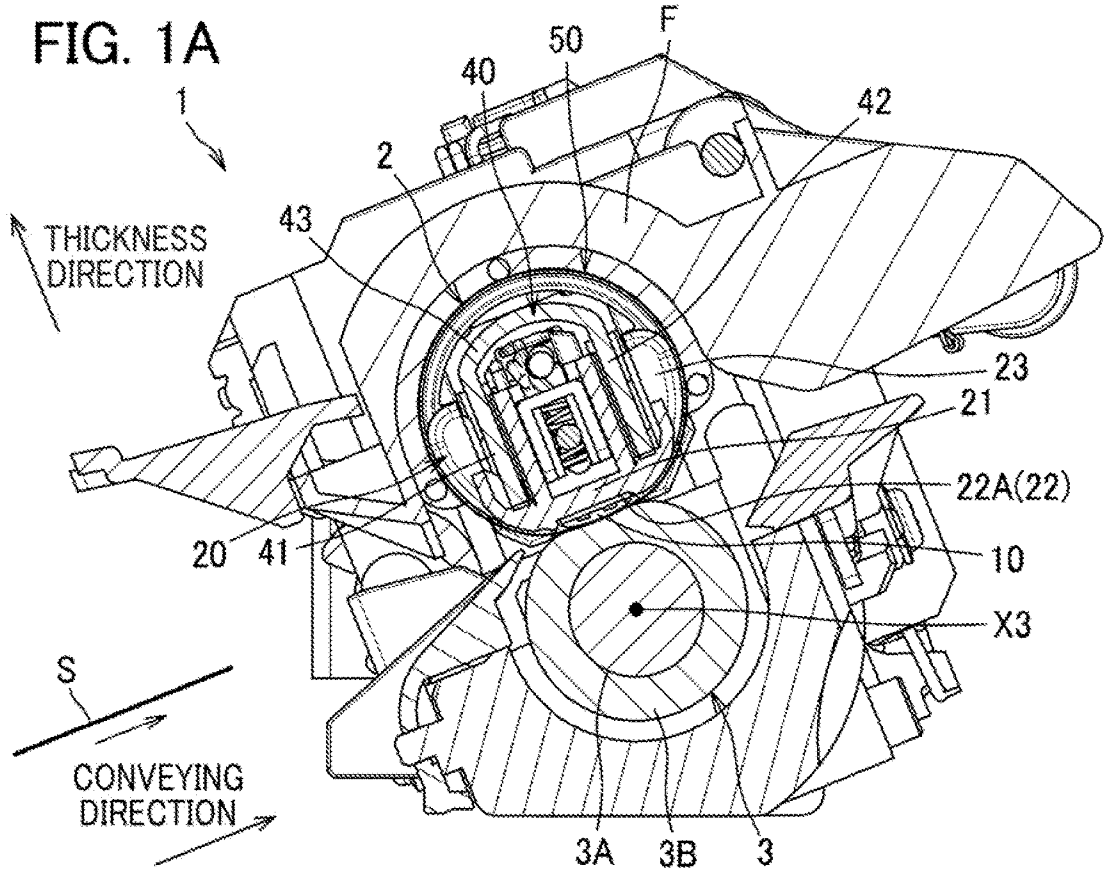
FIG. 1A is a cross-sectional view of a fixing device according to an embodiment.

A fixing device 1 illustrated in FIG. 1A is a device configured to fix a toner image onto a sheet S. The fixing device 1 is mounted on a main body of an image-forming apparatus. As illustrated in FIG. 1A, the fixing device 1 includes a heating unit 2 according to the embodiment, a pressure roller 3, and a frame F supporting the heating unit 2 and the pressure roller 3. Hereinafter, a direction in which the sheet S is to be conveyed in the fixing device 1 will be simply referred to as "conveying direction".

Figure 2:
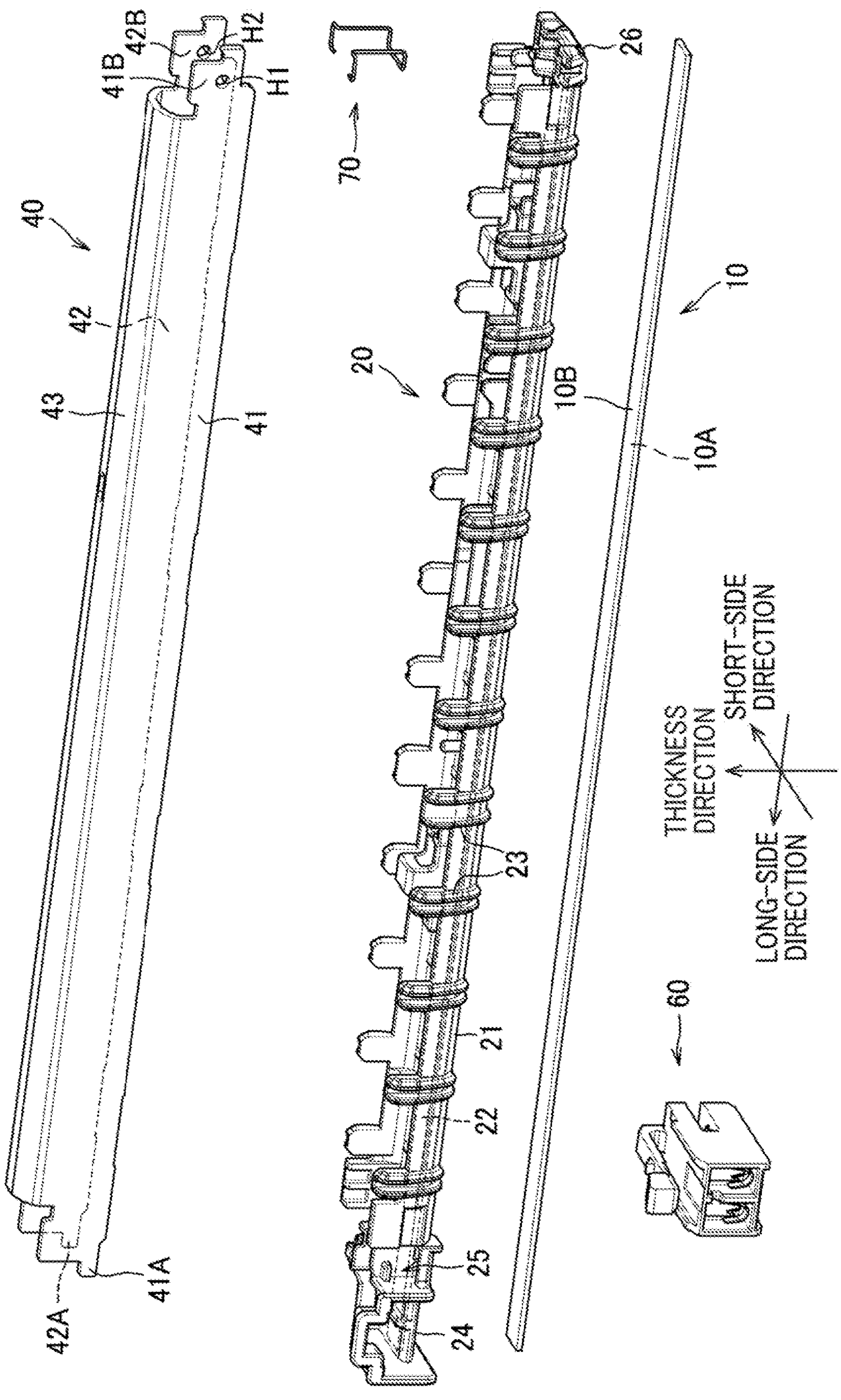
FIG. 2 is an exploded perspective view of the heater, a holder, a stay, and a clip in the fixing device.

The heating unit 2 includes a heater 10, a holder 20, a stay 40, a belt 50, a connector 60, and a clip 70 (see FIG. 2).

A part of the heater 10 is positioned in an internal space provided by the belt 50. The heater 10 is configured to apply heat to the sheet S through the belt 50.

Figure 1B:
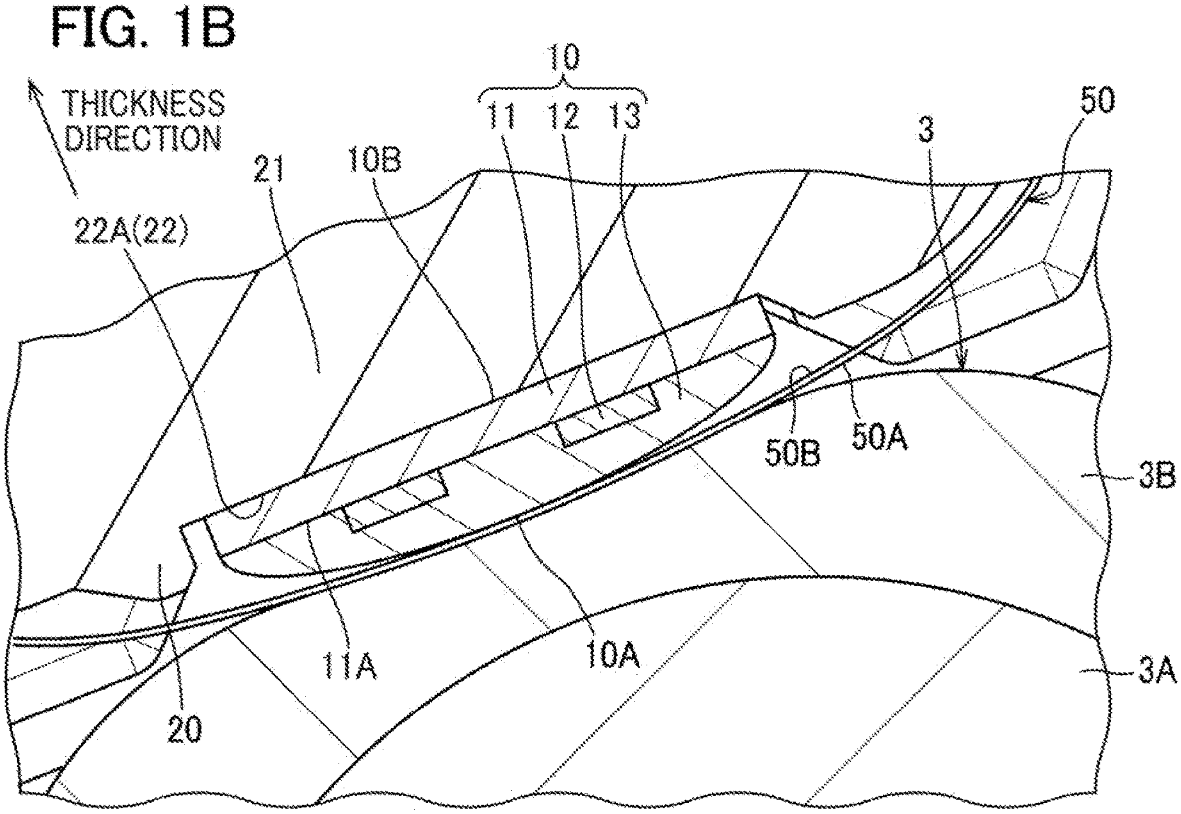
FIG. 1B is a partially-enlarged vertical cross-sectional view of a part of the fixing device in the vicinity of a heater.

The heater 10 is a so-called ceramic heater. As illustrated in FIG. 1B, the heater 10 has a first surface 10A and a second surface 10B. The first surface 10A is a surface in contact with an inner peripheral surface 50B of the belt 50. The second surface 10B is a surface opposite the first surface 10A. The heater 10 includes a base plate 11, a resistance heating element 12, and a cover 13.

The base plate 11 is a rectangular-shaped ceramic plate made of aluminium oxide. The base plate 11 has a thickness D2 defining a thickness direction (see FIG. 9).

In the following description, a direction in which each long side of the rectangular base plate 11 (heater 10) extend will be referred to as "long-side direction" and a direction in which each short side of the rectangular base plate 11 (heater 10) extend will be referred to as "short-side direction." That is, the thickness direction is orthogonal to the long-side direction and the short-side direction. Further, arrows in the drawings for these directions each point to one side of the respective directions. Specifically, in the following description, "one end" or "one end portion" implies a component at the one side in the corresponding direction (a leading side of the arrow), and "another end" or "another end portion" implies a component at another side in the corresponding direction (a trailing side of the arrow).

That is, the base plate 11 is elongated in the long-side direction. In the present embodiment, the short-side direction is aligned with the conveying direction of the sheet S.

The resistance heating element 12 is provided on a mount surface 11A of the base plate 11. The resistance heating element 12 is formed on the mount surface 11A of the base plate 11 by printing. The cover 13 is provided at the mount surface 11A of the base plate 11 to cover the resistance heating element 12. For example, the cover 13 is made of glass. Incidentally, in FIGS. 5, 8A, 8B and 10, the cover 13 is not illustrated to facilitate understanding.

As illustrated in FIG. 1A, the holder 20 supports the heater 10 and is configured to guide the belt 50. For example, the holder 20 is made of resin. As illustrated in FIG. 2, the holder 20 includes a base portion 21, a recess 22, a belt guide 23, a connector connecting portion 24, a stay retaining portion 25, and a clip engaging portion 26.

The base portion 21 is a rectangular-shaped plate elongated in the long-side direction.

As illustrated in FIG. 1B, the recess 22 is formed in the base portion 21. The recess 22 is recessed in the thickness direction away from the pressure roller 3. The heater 10 is fitted in the recess 22. The recess 22 has a bottom surface 22A that supports the heater 10.

The bottom surface 22A of the recess 22 will be referred as a supporting surface 22A. Specifically, the supporting surface 22A supports the second surface 10B of the heater 10.

The belt guide 23 extends from the base portion 21, along the inner peripheral surface 50B of the belt 50, toward upstream in the conveying direction as well as toward downstream in the conveying direction. As illustrated in FIG. 2, in the present embodiment, the belt guide 23 is configured of a plurality of ribs arrayed in the long-side direction. The belt 50 is configured to be guided by the ribs of the belt guide 23.

The connector connecting portion 24 is a part of the holder 20 to which the connector 60 (described later) is connected. The connector connecting portion 24 is provided at an end portion of the base portion 21 at one side in the long-side direction.

Figure 3A:
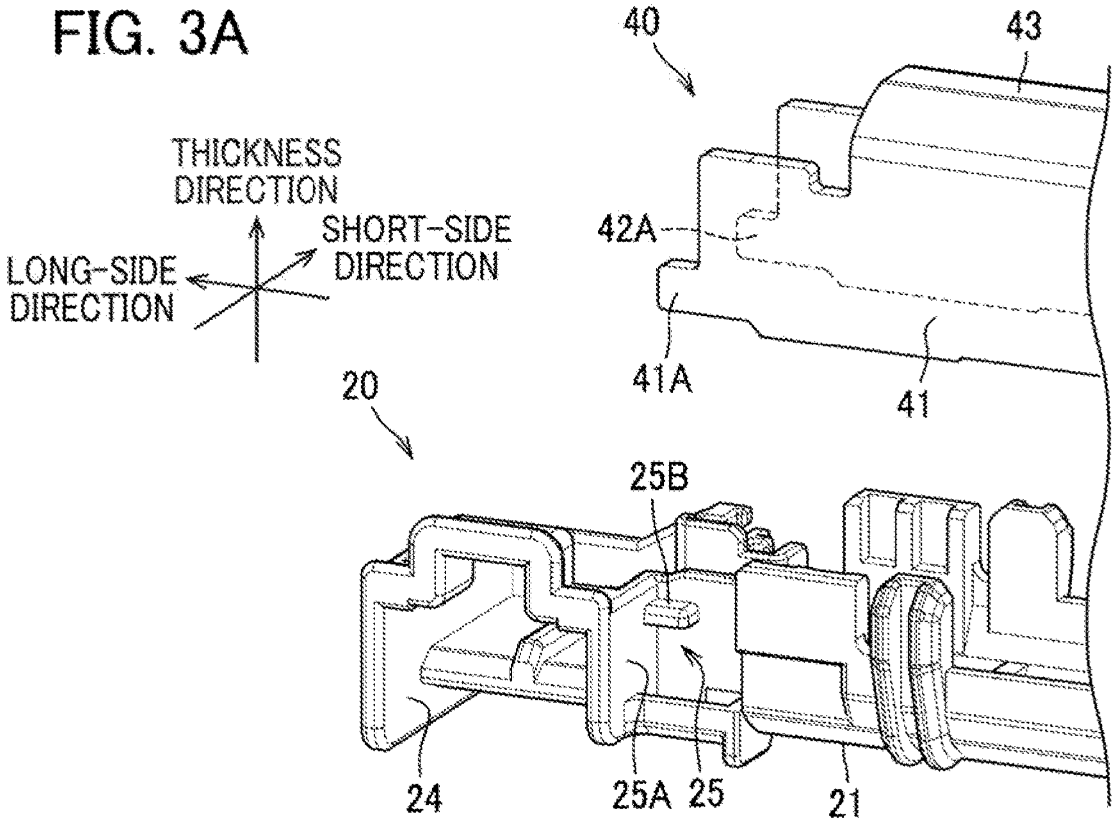
FIG. 3A is a partially-enlarged perspective view illustrating end portions of the holder and the stay at one side in a long-side direction before assembly of the stay to the holder as viewed from other side in a short-side direction.
Figure 3B:
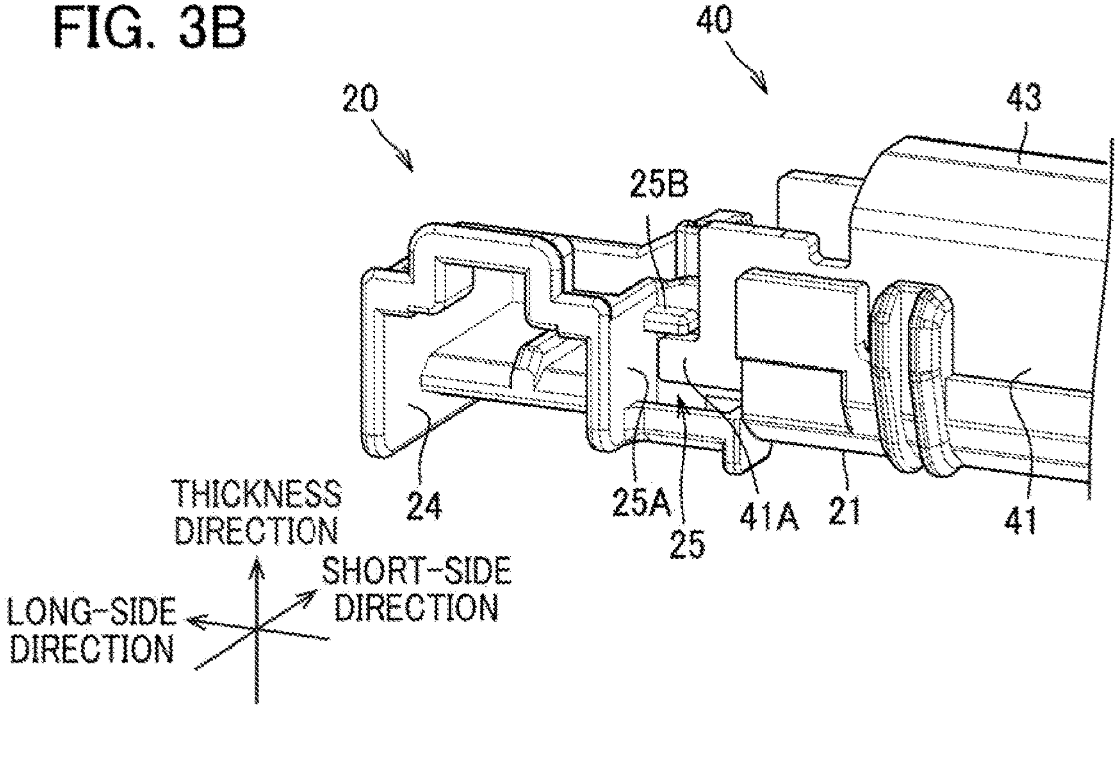
FIG. 3B is a partially-enlarged perspective view illustrating the end portions of the holder and the stay at the one side in the long-side direction after assembly of the stay to the holder as viewed from the other side in the short-side direction.
Figure 4A:
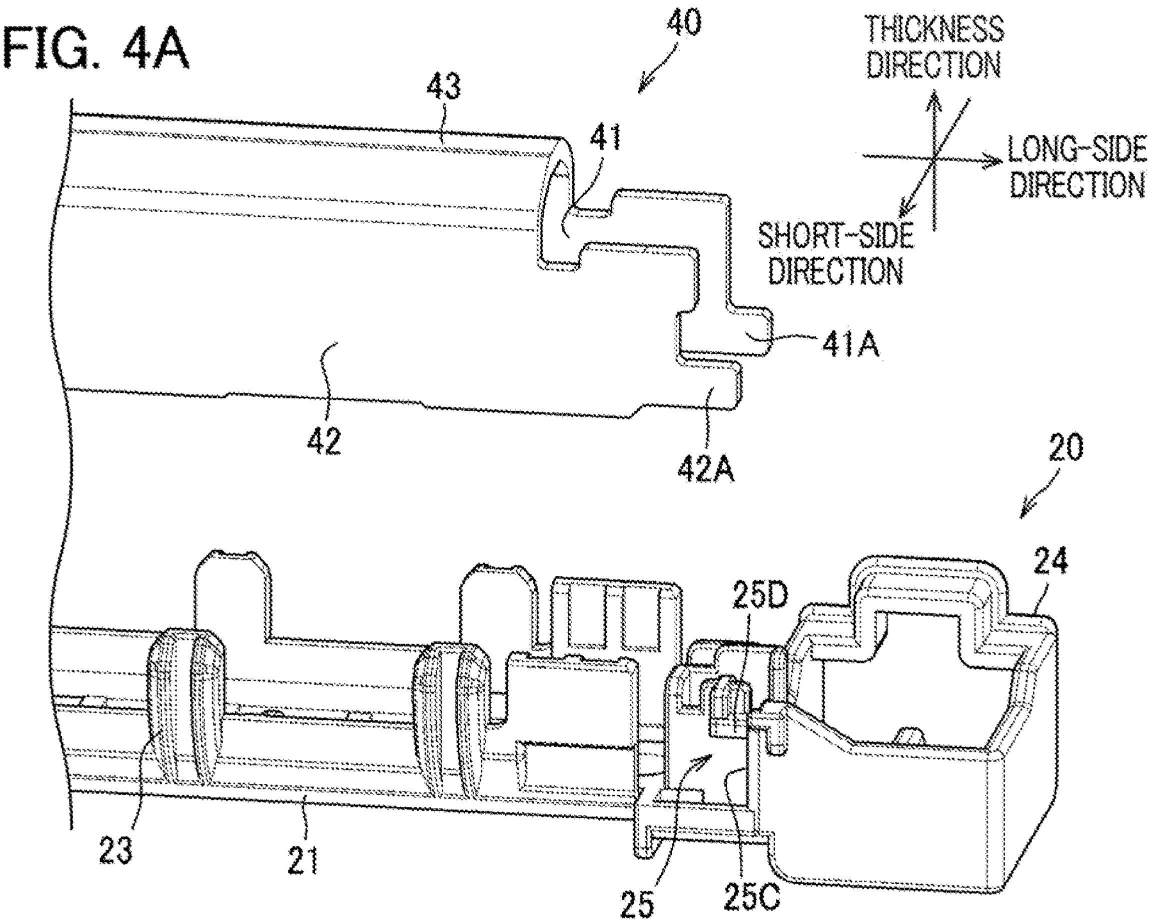
FIG. 4A is a partially-enlarged perspective view illustrating the end portions of the holder and the stay at the one side in the long-side direction before assembly of the stay to the holder as viewed from one side in the short-side direction.

The stay retaining portion 25 is configured to hold one end portion of the stay 40 at the one side in the long-side direction. The stay retaining portion 25 is provided on the base portion 21 at a position between the belt guide 23 and the connector connecting portion 24 in the long-side direction. As illustrated in FIGS. 3A and 4A, the stay retaining portion 25 has a first retaining surface 25A, a first rib 25B, a second retaining surface 25C, and a second rib 25D.

As illustrated in FIG. 3A, the first retaining surface 25A is a surface orthogonal to the long-side direction. The first retaining surface 25A constitutes an end of the stay retaining portion 25 at another side in the short-side direction.

The first rib 25B protrudes from the first retaining surface 25A toward the other side in the long-side direction. In the thickness direction, the first rib 25B is arranged to be spaced apart from the base portion 21 to define a space therebetween for receiving a first protruding portion 41A (described later) of the stay 40.

Figure 4B:
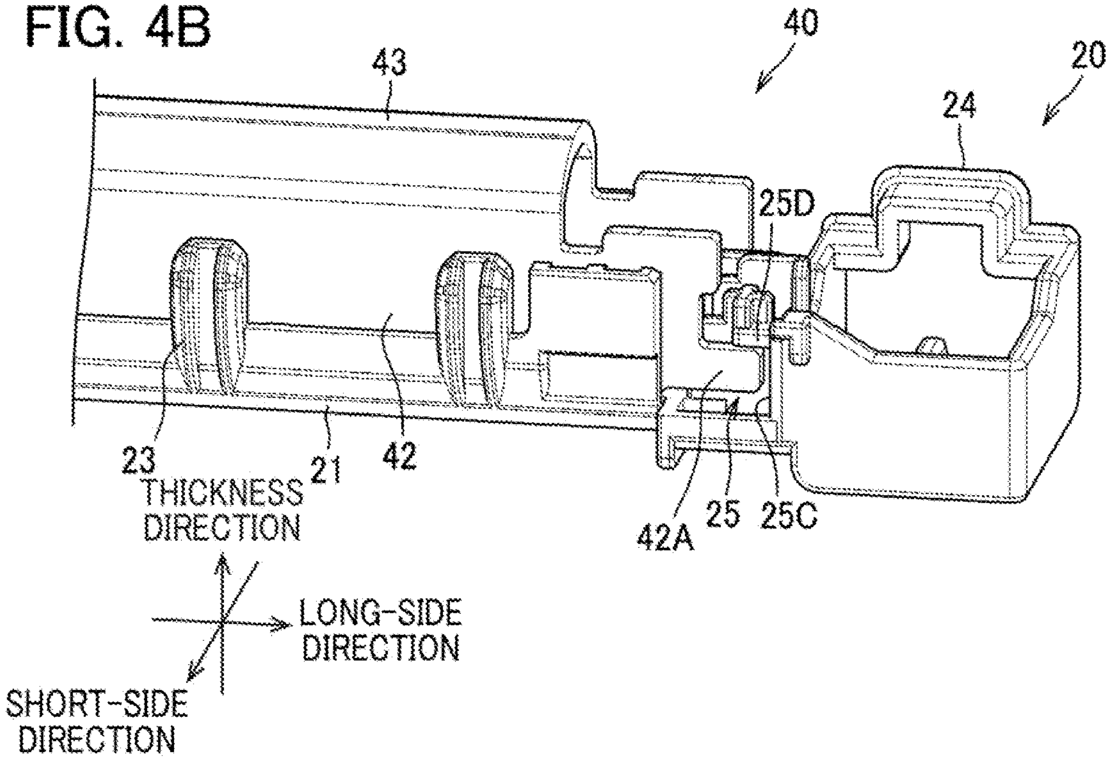
FIG. 4B is a partially-enlarged perspective view illustrating the end portions of the holder and the stay at the one side in the long-side direction after assembly of the stay to the holder as viewed from the one side in the short-side direction.

As illustrated in FIG. 4, the second retaining surface 25C is a surface orthogonal to the long-side direction. The second retaining surface 25C constitutes an end of the stay retaining portion 25 at the other side in the short-side direction.

The second rib 25D protrudes from the second retaining surface 25C toward the other side in the long-side direction. In the thickness direction, the second rib 25D is arranged to be spaced apart from the base portion 21 to define a space therebetween for receiving a second protruding portion 42A (described later) of the stay 40.

The clip engaging portion 26 is positioned at an end portion of the holder 20, the end portion being at the other side in the long-side direction and at the other side in the thickness direction (see FIG. 2). The clip engaging portion 26 has a first groove M1, a second groove M2, a third groove M3, a fourth groove M4, a fifth groove M5, and a sixth groove M6.

Figure 8A:
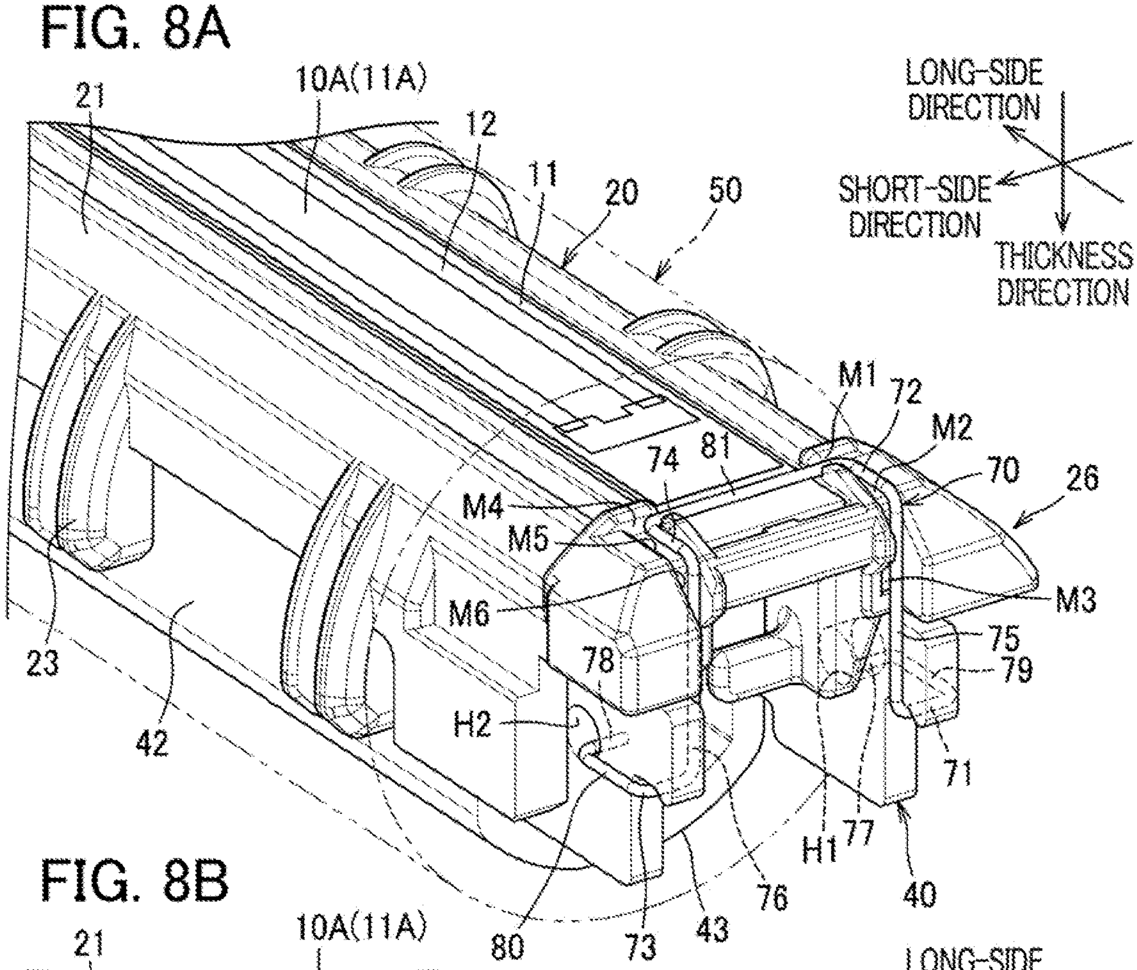
FIG. 8A is a perspective bottom view of the end portions of the holder and the stay at the other side in the long-side direction viewed in a state where the clip is assembled to the holder and the stay.
Figure 8B:
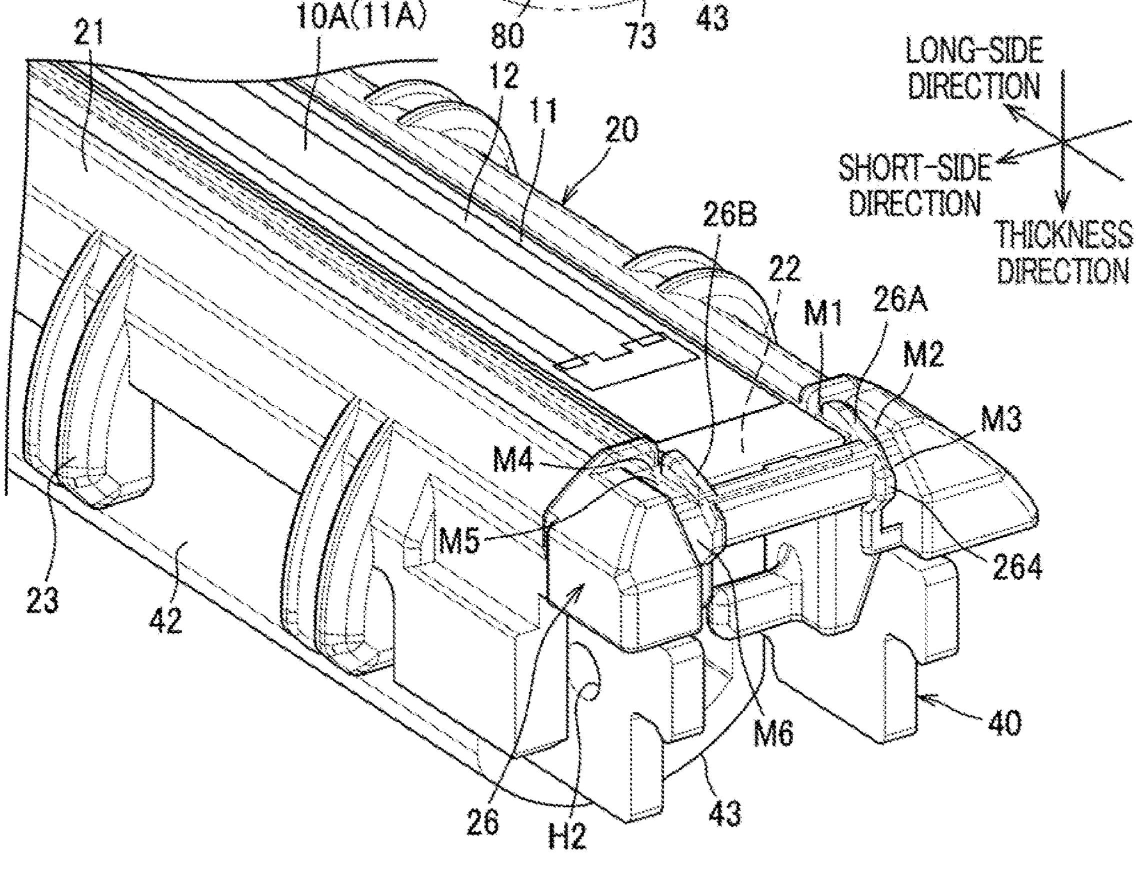
FIG. 8B is a perspective bottom view of the end portions of the holder and the stay at the other side in the long-side direction in a state where the clip is removed from the holder and the stay.

Referring to FIGS. 8A and 8B, the first groove M1, the second groove M2, and the third groove M3 are provided on the other side of the recess 22 in the short-side direction. The first groove M1 extends from the recess 22 toward the other side in the short-side direction. The second groove M2 extends toward the other side in the long-side direction from an end of the first groove M1 at the other side in the short-side direction. The third groove M3 extends toward the one side in the thickness direction from an end of the second groove M2 at the other side in the long-side direction.

The fourth groove M4, the fifth groove M5, and the sixth groove M6 are symmetrical to the first groove M1, the second groove M2, and the third groove M3 with respect to the short-side direction. The fourth groove M4, the fifth groove M5, and the sixth groove M6 are provided on the one side of the recess 22 in the short-side direction. The fourth groove M4 extends from the recess 22 toward the one side in the short-side direction. The fifth groove M5 extends toward the other side in the long-side direction from an end of the fourth groove M4 at the one side in the short-side direction. The sixth groove M6 extends toward the one side in the thickness direction from an end of the fifth groove M5 at the other side in the long-side direction.

On the one side of the second groove M2 in the short-side direction (on the other side of the recess 22 in the short-side direction), a partition wall 26A is provided to separate the second groove M2 from the recess 22. The partition wall 26A has a sloped surface that extends toward the one side in the thickness direction as extending toward the other side in the long-side direction.

On the other side of the fourth groove M4 in the short-side direction (on the one side of the recess 22 in the short-side direction), a partition wall 26B is provided to separate the fourth groove M4 from the recess 22. The partition wall 26B has a sloped surface that extends toward the one side in the thickness direction as extending toward the other side in the long-side direction.

As illustrated in FIG. 1A, the stay 40 supports the holder 20 from the opposite side of the holder 20 from the heater 10 in the thickness direction. That is, the stay 40 is positioned opposite the heater 10 with respect to the holder 20 in the thickness direction. The stay 40 is made of metal, for example. The stay 40 has a U-shape when viewed in the long-side direction. Specifically, the stay 40 has a first wall 41, a second wall 42, and a third wall 43.

The first wall 41 extends in the thickness direction, i.e., in a direction orthogonal to the mount surface 11 of the base plate 11 (or to the second surface 10B of the heater 10). Specifically, the first wall 41 extends in the long-side direction and the thickness direction. The first wall 41 has an end in contact with the holder 20, the end being at the one side in the thickness direction. As illustrated in FIG. 2, the first wall 41 includes the first protruding portion 41A and a first extending portion 41B.

As illustrated in FIG. 3A, the first protruding portion 41A is positioned at one end portion of the first wall 41 at the one side in the long-side direction. The first protruding portion 41A protrudes toward the one side in the long-side direction. In the thickness direction, the first protruding portion 41A is positioned at an end portion of the first wall 41 at the other side. The first protruding portion 41A is positioned further outward on the one side in the long-side direction relative to the third wall 43.

Figure 6:
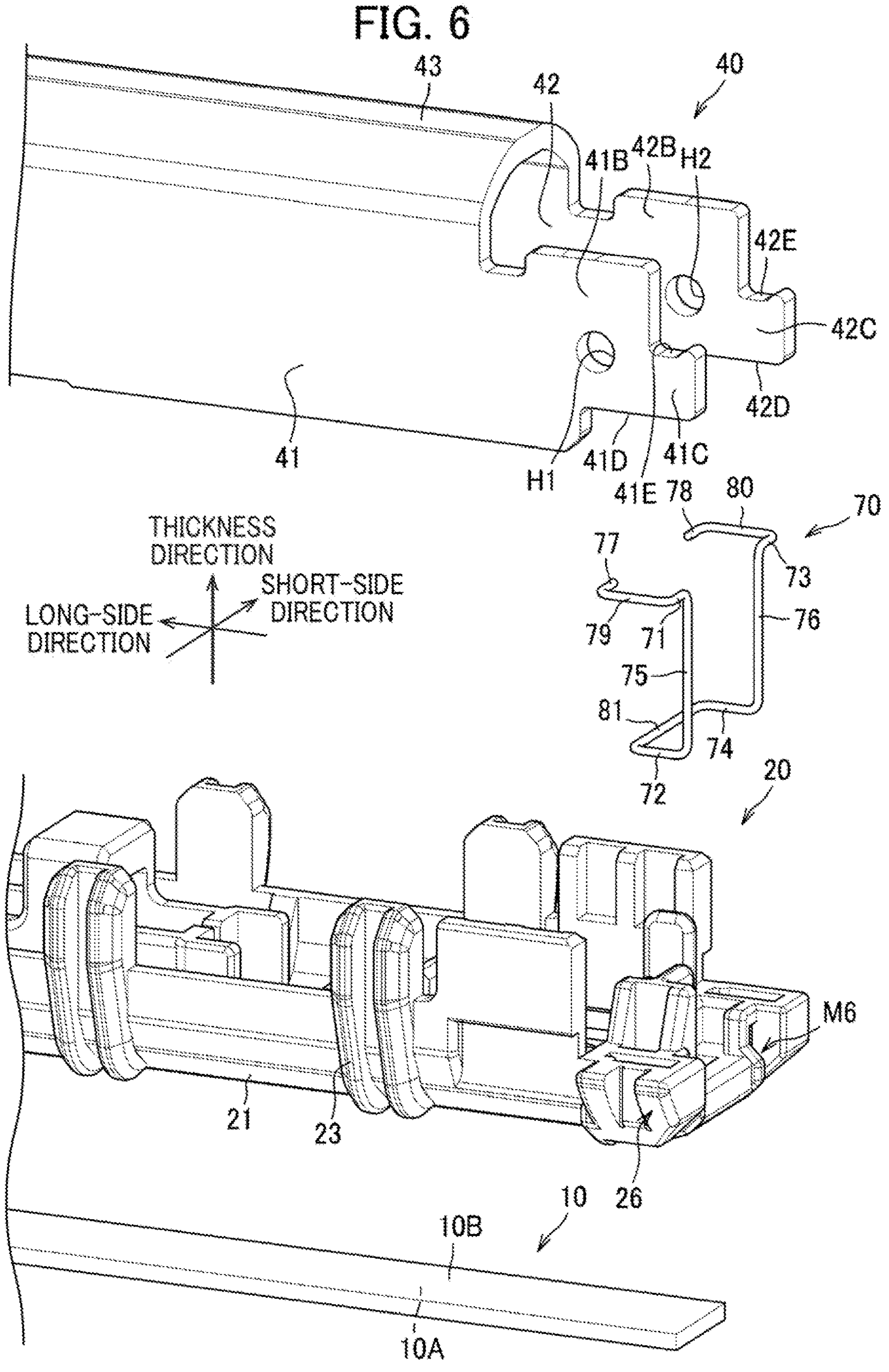
FIG. 6 is a partially-enlarged exploded perspective view of the heater, the holder, the stay, and the clip at another side in the long-side direction.
Figure 7:
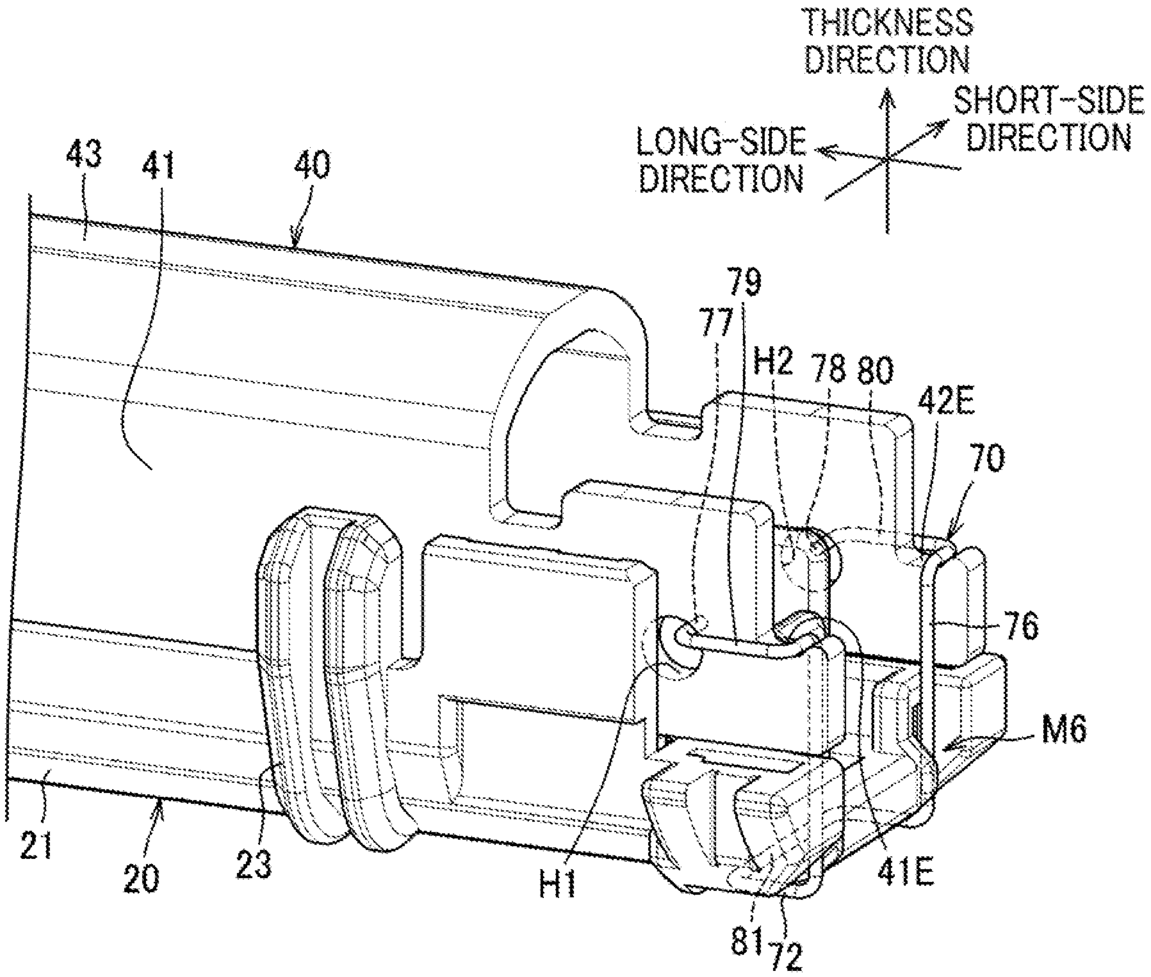
FIG. 7 is a partially-enlarged perspective view of end portions of the holder and the stay at the other side in the long-side direction to which the clip is assembled.

Referring to FIG. 6, the first extending portion 41B is positioned at another end portion of the first wall 41 at the other side in the long-side direction. The first extending portion 41B extends toward the other side in the long-side direction. The first extending portion 41B is positioned further outward on the other side in the long-side direction relative to the third wall 43.

Specifically, as illustrated in FIG. 6, the first extending portion 41B has a first protrusion 41C, a notch 41D, and a first hole H1. The first protrusion 41C constitutes an end portion of the first extending portion 41B at the other side in the long-side direction. The first protrusion 41C protrudes toward the other side in the long-side direction. The notch 41D is formed at an end of the first extending portion 41B at the other side in the thickness direction. The first hole H1 penetrates through the first extending portion 41B in the short-side direction. A recces portion 41E is formed on an end surface of the first protrusion 41C at one side in the thickness direction.

As illustrated in FIG. 2, the second wall 42 is arranged to be spaced apart from the first wall 41 in the short-side direction. The second wall 42 extends in the thickness direction, i.e., in the direction orthogonal to the mount surface 11A of the base plate 11 (or to the second surface 10B of the heater 10). Specifically, the second wall 42 extends in the long-side direction and the thickness direction. The second wall 42 has an end in contact with the holder 20, the end being at the other side in the thickness direction. The second wall 42 has the same shape as the first wall 41. Specifically, the second wall 42 includes the second protruding portion 42A and a second extending portion 42B.

As illustrated in FIG. 4A, the second protruding portion 42A is positioned at one end portion of the second wall 42 at the one side in the thickness direction. The second protruding portion 42A protrudes toward the one side in the long-side direction. In the thickness direction, the second protruding portion 42A is positioned at an end portion of the second wall 42 at the other side. The second protruding portion 42A is positioned further outward on the one side in the long-side direction relative to the third wall 43.

Referring to FIG. 6, the second extending portion 42B is positioned at another end portion of the second wall 42 at the other side in the long-side direction. The second extending portion 42B extends toward the other side in the long-side direction. The second extending portion 42B is positioned further toward the other side in the long-side direction than the third wall 43.

Specifically, as illustrated in FIG. 6, the second extending portion 42B has a second protrusion 42C, a notch 42D, and a second hole H2. The second protrusion 42C constitutes an end of the second extending portion 42B at the other side in the long-side direction. The second protrusion 42C protrudes toward the other side in the long-side direction. The notch 42D is formed at an end of the second extending portion 42B at the other side in the thickness direction. The second hole H2 penetrates through the second extending portion 42B in the short-side direction. A recessed portion 42E is formed on an end surface of the second protrusion 42C at the one side in the thickness direction.

The third wall 43 extends in the long-side direction and the short-side direction. The third wall 43 connects an end portion of the first wall 41 at the one side in the thickness direction to an end portion of the second wall 42 at the one side in the thickness direction.

As illustrated in FIGS. 1A and 1B, the belt 50 is an endless belt. The belt 50 is configured to circularly move around the heater 10 while being guided by the holder 20. The belt 50 extends in the long-side direction to cover a prescribed region of the holder 20 and the stay 40 in the long-side direction, as indicated by phantom lines in FIGS. 5 and 8A.

The belt 50 has an outer peripheral surface 50A and the inner peripheral surface 50B. The outer peripheral surface 50A contacts the pressure roller 3 or the sheet S to be heated. The inner peripheral surface 50B contacts the first surface 10A of the heater 10. The belt 50 is circularly movable to convey the sheet S in cooperation with the pressure roller 3.

The pressure roller 3 is configured to rotate about a rotation axis X3 extending in the long-side direction. The pressure roller 3 and the heater 10 nip the belt 50 therebetween. The pressure roller 3 is configured to rotate to convey the sheet S in cooperation with the belt 50. The pressure roller 3 includes a shaft 3A and an elastic layer 3B. The shaft 3A has a solid columnar shape and is made of metal, for example. The elastic layer 3B has a hollow cylindrical shape and is made of silicon rubber, for example. The elastic layer 3B is provided to cover an outer peripheral surface of the shaft 3A.

Figure 5:
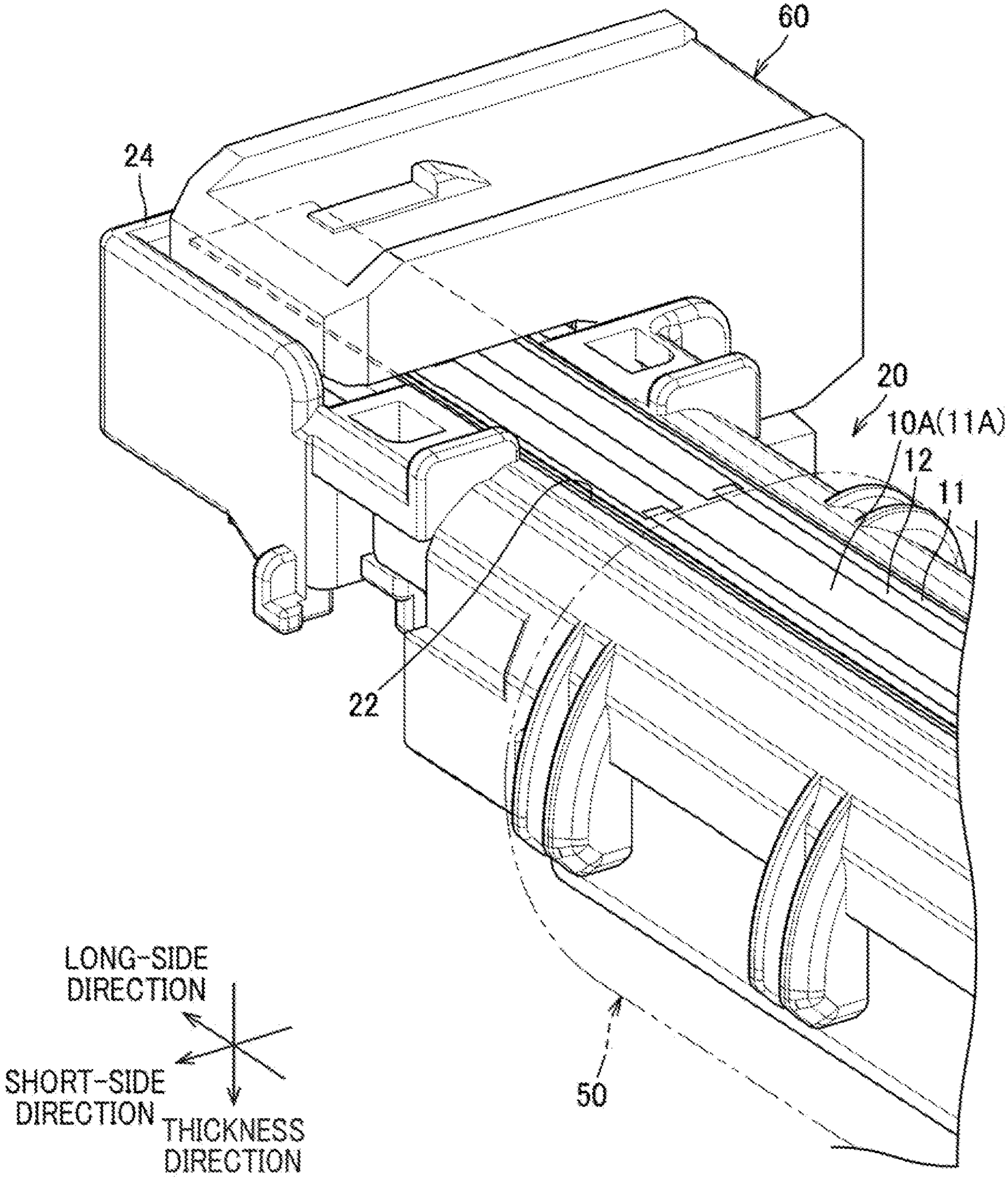
FIG. 5 is a partially-enlarged bottom view of the end portions of the holder and the stay at the one side the long-side direction to which a connector is attached.

The connector 60 is configured to supply power to the heater 10. The connector 60 is attached to the holder 20 supporting the heater 10 such that the connector 60 is electrically connected to the heater 10. Specifically, as illustrated FIGS. 2 and 5, the connector 60 is connected to one end portion of the heater 10 at the one side in the long-side direction. As illustrated in FIG. 5, the connector 60 is electrically connected to the heater 10 upon attachment of the connector 60 to the holder 20. The one end portion of the heater 10 in the long-side direction is nipped between the connector 60 and the holder 20 to be held therebetween.

The clip 70 is configured as a metallic wire. The clip 70 functions to nip the holder 20 and the stay 40 together to retain the holder 20 on the stay 40. In the present embodiment, the clip 70 is positioned at another end portion of the holder 20 at the other side in the long-side direction. That is, the clip 70 nips the other end portion of the holder 20 in the long-side direction and the other end portion of the stay 40 in the long-side direction to retain the holder 20 on the stay 40.

As illustrated in FIG. 6, the clip 70 has a first engaging part 71, a second engaging part 72, a third engaging part 73, a fourth engaging part 74, a first connecting part 75, a second connecting part 76, a first end part 77, a second end part 78, a third connecting part 79, a fourth connecting part 80, and a first part 81.

The first engaging part 71 extends in the short-side direction. The first engaging part 71 is a part that engages the first wall 41 of the stay 40. Specifically, the first engaging part 71 engages the recces portion 41E of the first protrusion 41C of the first wall 41.

The second engaging part 72 extends in the long-side direction. The second engaging part 72 is a part that engages the holder 20.

The first connecting part 75 extends in the thickness direction. The first connecting part 75 connects an end of the first engaging part 71 at the one side in the short-side direction to an end of the second engaging part 72 at the other side in the long-side direction.

The third engaging part 73 extends in the short-side direction. The third engaging part 73 is a part that engages the second wall 42 of the stay 40. That is, the first engaging part 71 and the third engaging part 73 engage the stay 40 at different positions from each other (the first engaging part 71 engages the first wall 41, while the third engaging part 73 engages the second wall 42). Specifically, the third engaging part 73 engages the recessed portion 42E of the second protrusion 42C of the second wall 42.

The fourth engaging part 74 extends in the long-side direction. The fourth engaging part 74 is a part that engages the holder 20 at a position different from the position where the second engaging part 72 engages the holder 20.

The second connecting part 76 extends in the thickness direction. The second connecting part 76 connects an end of the third engaging part 73 at other side in the short-side direction to an end of the fourth engaging part 74 at other side in the long-side direction.

The first part 81 extends in the short-side direction. The first part 81 is connected to the second engaging part 72 and the fourth engaging part 74. Specifically, the first part 81 connects an end of the second engaging part 72 at one side in the long-side direction to an end of the fourth engaging part 74 at the one side in the long-side direction.

The first end part 77 extends in the short-side direction.

The second end part 78 extends in the short-side direction.

The third connecting part 79 extends in the long-side direction. The third connecting part 79 connects an end of the first engaging part 71 at the other side in the short-side direction to an end of the first end part 77 at the other side in the short-side direction.

The fourth connecting part 80 extends in the long-side direction. The fourth connecting part 80 connects an end of the third engaging part 73 at the one side in the short-side direction to an end of the second end part 78 at the one side in the short-side direction.

As illustrated in FIG. 8A, the clip 70 is assembled to the holder 20 and the stay 40 such that the clip 70 nips the holder 20 and the stay 40 together to hold the same. In a state where the clip 70 is assembled to the holder 20 and the stay 40 (hereinafter, simply will be referred to as "assembled state"), the first part 81 is fitted in the first groove M1 and the fourth groove M4. In the assembled state, the second engaging portion 72 is fitted in the second groove M2 of the holder 20. In the assembled state, the first connecting part 75 is fitted in the third groove M3. In the assembled state, the fourth engaging part 74 is fitted in the fifth groove M5 of the holder 20. In the assembled state, the second connecting part 76 is fitted in the sixth groove M6. In the assembled state, the first end part 77 is fitted in the first hole H1 of the first extending portion 41B. In the assembled state, the second end part 78 is fitted in the second hole H2 of the second extending portion 42B.

In the assembled state, the clip 70 is positioned outside of the region where the belt 50 extends in the long-side direction (see the region indicated by the phantom lines in FIG. 8A). Although not illustrated in the drawings, the cover 13 of the heater 10 extends in the long-side direction to cover a region corresponding to the region where the belt 50 is positioned.

Further, in the assembled state, the first part 81 overlaps with the heater 10 when viewed in the direction orthogonal to the mount surface 11A of the base plate 11 (or the second surface 10B of the heater 10), i.e., when the viewed in the thickness direction. In the present embodiment, in a state where the heater 10 is supported by the holder 20, the one end portion of the heater 10 in the long-side direction is restricted from getting detached from the holder 20 by the connector 60 while the other end portion of the heater 10 in long-side direction is restricted from getting detached from the holder 20 by the clip 70. With this configuration, the clip 70 can restrict detachment of the heater 10 from the holder 20 in the state where the heater 10 is supported by the holder 20.

Figure 9:
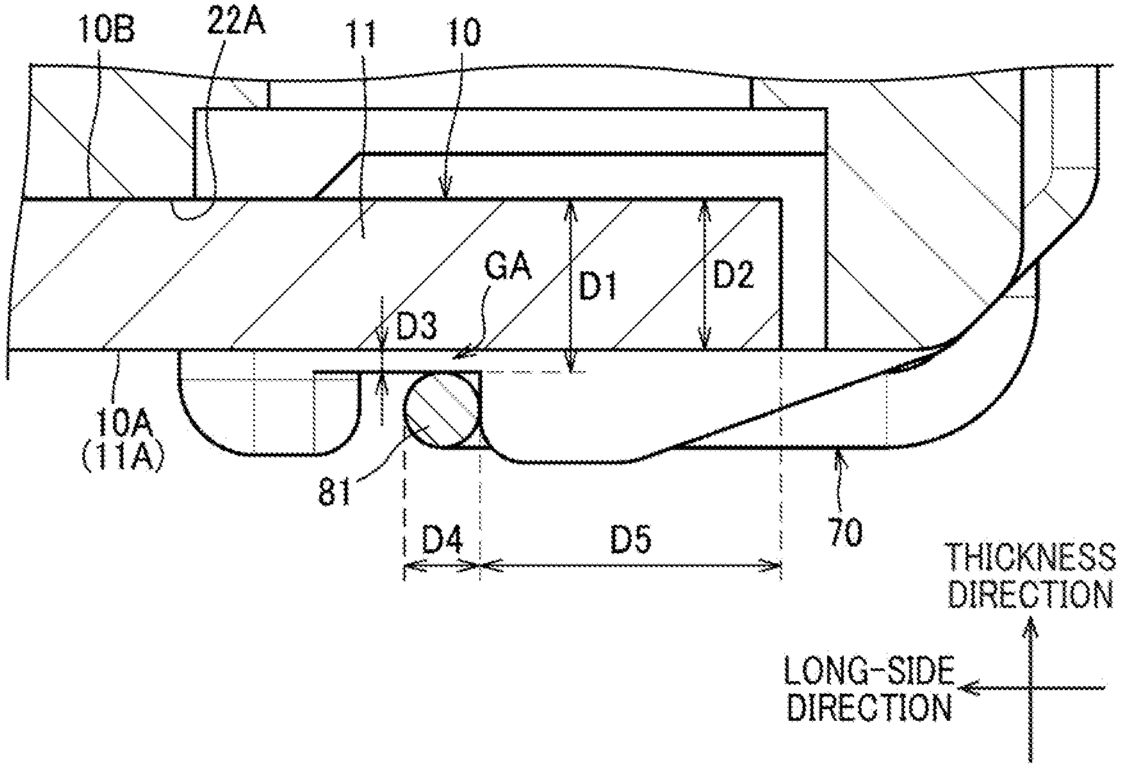
FIG. 9 is a cross-sectional view of the heater, the holder, and the clip as viewed in the short-side direction.

FIG. 9 illustrates the end portions of the holder 20 and the stay 40 at the other side in the long-side direction. Since the cover 13 is provided to correspond to the belt 50 in the long-side direction, the mount surface 11A of the base plate 11 is coincident with the first surface 10A of the heater 10 in FIG. 9.

As illustrated in FIG. 9, a distance D1 is greater than the thickness D2 of the base plate 11 of the heater 10 (D2<D1), where the distance D1 is defined as a distance between the supporting surface 22A of the holder 20 and the first part 81 in the thickness direction. In other words, a gap GA is formed between the first surface 10A of the heater 10 (the mount surface 11A of the base plate 11) and the first part 81 in the thickness direction. The gap GA provides a dimension D3 in the thickness direction that is smaller than the thickness D2 of the base plate 11 (D3<D2). Also, the dimension D3 of the gap GA in the thickness direction is smaller than a diameter D4 of the first part 81 of the clip 70 (D3<D4). Further, a dimension D5 is greater than the dimension D3 of the gap GA in the thickness direction (D3<D5), where the dimension D5 is defined as a dimension of a portion of the heater 10 that is positioned further outward on the other side in the long-side direction relative to the first part 81 of the clip 70.

Figure 10:
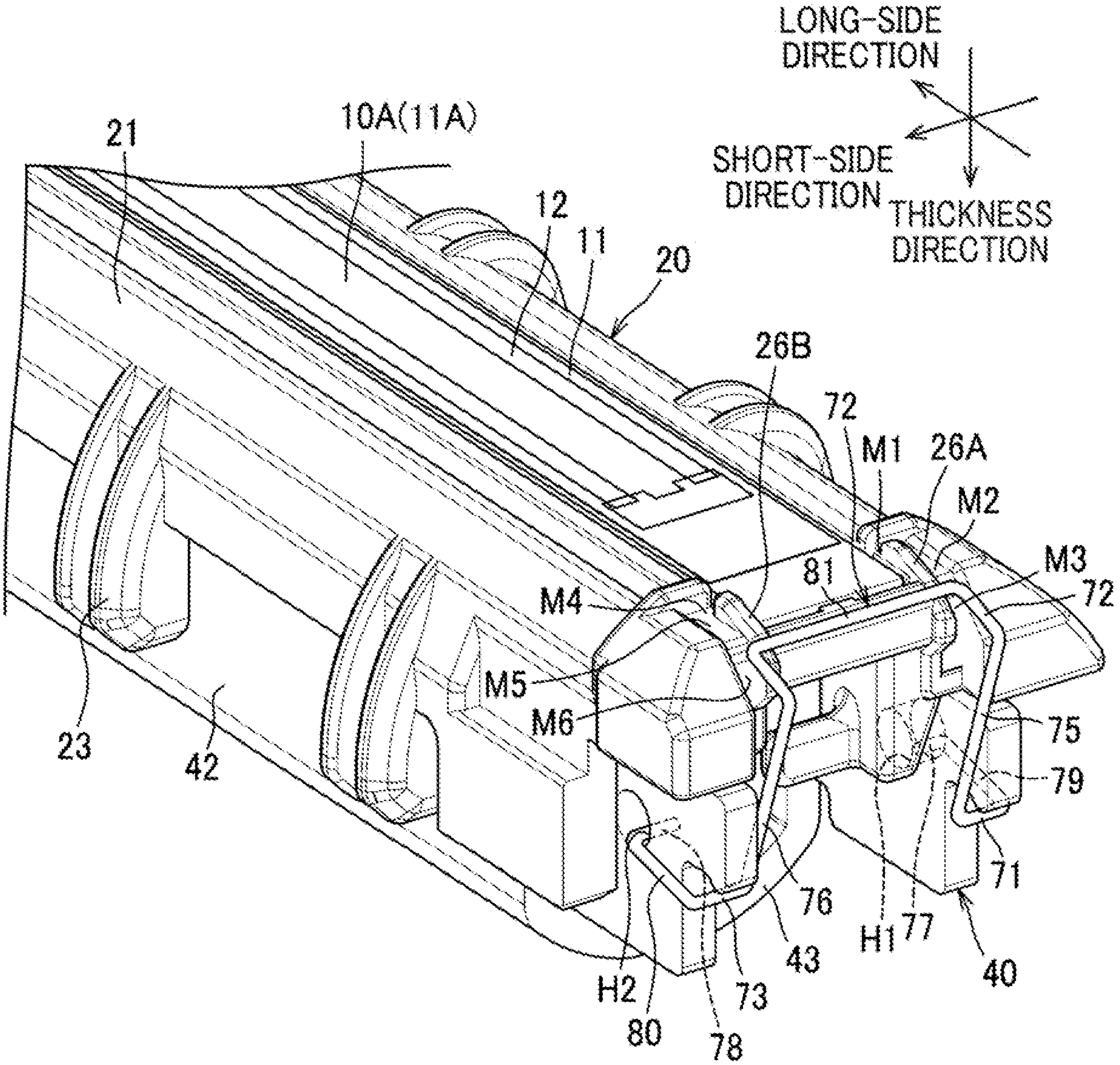
FIG. 10 is a view illustrating the end portions of the holder and the stay at the other side in the long-side direction in a state where the clip is pivotally moved from the state illustrated in the FIG. 8A.

As illustrated in FIGS. 8A and 10, the clip 70 is pivotable between an engaged state (illustrated in FIG. 8A) and a disengaged state (illustrated in FIG. 10). As illustrated in FIG. 8A, in the engaged state, the clip 70 nips the holder 20 and the stay 40 together to retain the holder 20 and the stay 40 with the first end part 77 fitted in the first hole H1 and the second end part 78 fitted in the second hole H2. As illustrated in FIG. 10, in the disengaged state, the first part 81 is disengaged from the holder 20, so that the clip 70 does not hold the holder 20 and the stay 40.

Next, how the heater 10, the holder 20, and the stay 40 are assembled will be described.

As illustrated in FIG. 2, for assembly of the heater 10, the holder 20 and the stay 40, respective end portions of the heater 10, the holder 20, and the stay 40 at the one side in the long-side direction are first assembled, and subsequently respective end portions of the heater 10, the holder 20, and the stay 40 at the other side in the long-side direction are assembled.

Specifically, as illustrated in FIGS. 3A through 4B, the first protruding portion 41A and the second protruding portion 42A of the stay 40 are both fitted in the stay retaining portion 25 of the holder 20. As a result, since the first protruding portion 41A abuts on the first retaining surface 25A, the first protruding portion 41A is restricted from moving toward the one side in the long-side direction. Also, since the first protruding portion 41A abuts on the first rib 25B, the first protruding portion 41A is restricted from moving toward the one side in the thickness direction. Likewise, since the second protruding portion 42A abuts on the second retaining surface 25C, the second protruding portion 42A is restricted from moving toward the one side in the long-side direction. Also, since the second protruding portion 42A abuts on the second rib 25D, the second protruding portion 42A is restricted from moving toward the one side in the thickness direction. In this way, the one end portion of the stay 40 at the one side in the long-side direction is held so as not to be disengaged from the holder 20 toward the one side in the thickness direction.

Subsequently the heater 10 is fitted in the recess 22 and the connector 60 is attached to the holder 20, as illustrated in FIG. 5. The heater 10 and the connector 60 are thus electrically connected to each other. Since the end portion of the heater 10 at the one side in the long-side direction is nipped between the connector 60 and the holder 20, the end portion of the heater 10 at the one side in the long-side direction is fixed in position in the thickness direction.

As illustrated in FIG. 6, the clip engaging portion 26 of the holder 20 is then fitted in the notches 41D and 42D of the stay 40. Due to this fitting engagement of the clip engaging portion 26 with the notches 41D and 42D, the stay 40 is restricted from getting disengaged from the holder 20 in the long-side direction.

The clip 70 is then assembled to the holder 20 and the stay 40.

Specifically, first, the first end part 77 of the clip 70 is inserted into the first hole H1, and the second end part 78 of the clip 70 is inserted into the second hole H2.

The clip 70 is then pivotally moved about the first end part 77 and the second end part 78. The first part 81 is guided by the sloped surfaces of the respective partition walls 26A and 26B to be received in the first groove M1 and the fourth groove M4. As illustrated in FIG. 8A, when the first part 81 is fitted in the first groove M1 and the fourth groove M4, the first part 81 faces the first surface 10A of the heater 10 (the mount surface 11A of the base plate 11). At this time, the first part 81 is overlapped with the heater 10 when viewed in the thickness direction. Note that the first part 81 fitted in the first groove M1 and the fourth groove M4 is positioned outside of the prescribed region where the belt 50 is provided in the long-side direction. That is, the first part 81 is not overlapped with the resistance heating element 12 (covered by the cover 13) of the heater 10 when viewed in the thickness direction.

According to the above-described embodiment, the following technical advantages can be attained.

In the heating unit 2 according to the present embodiment, the clip 70 holding the holder 20 and the stay 40 has the first part 81 that restricts detachment of the heater 10 in the thickness direction. With this configuration, accidental detachment of the heater 10 from the holder 20 can be restrained during assembly of the heating unit 2 to the frame F of the fixing device 1.

Further, since the clip 70 is positioned outside the region where the belt 50 is provided in the long-side direction, the clip 70 does not interfere with the movement of the belt 50.

Further, as illustrated in FIG. 9, the distance D1 between the supporting surface 22A of the holder 20 supporting the heater 10 and the first part 81 of the clip 70 is greater than the thickness D2 of the base plate 11 (D2<D1). With this structure, the heater 10 is less likely to be damaged due to thermal expansion thereof.

Further, the dimension D3 of the gap GA in the thickness direction between the first surface 10A (the mount surface 11A) and the first part 81 of the clip 70 is smaller than the thickness D2 of the base plate 11 (D3<D2). This structure can restrict detachment of the heater 10 from the holder 20.

Further, the dimension D3 of the gap GA in the thickness direction is smaller than the diameter D4 of the first part 81 of the clip 70 (D3<D4). This structure can further restrict detachment of the heater 10 from the holder 20.

Still further, the dimension D5 of the portion of the heater 10 (which is positioned further outward on the other side in the long-side direction relative to the first part 81) is greater than the dimension D3 of the gap GA in the thickness direction (D3<D5). This configuration can further restrain the heater 10 from coming off the holder 20.

The clip 70 is pivotally movable between the engaged state for retaining the holder 20 on the stay 40 (FIG. 8A) and the disengaged state for releasing the holder 20 from the stay 40 (FIG. 10). This configuration can facilitate assembly of the heating unit 2.

The holder 20 has the first groove M1 (fourth groove M4) that extends in the short-side direction. The engagement of the clip 70 with the first groove M1 (fourth groove M4) can restrict disengagement of the clip 70 from the holder 20.

Further, the holder 20 has the second groove M2 (fifth groove M5) that extends in the short-side direction. The engagement of the clip 70 with the second groove M2 (fifth groove M5) can suppress disengagement of the clip 70 from the holder 20.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiment, the clip 70 is provided at the end portion of the holder 20 only at the one side in the long-side direction. However, the clip 70 may be provided at end portions of the holder 20 on both sides in the long-side direction.

In the above-described embodiment, the clip 70 is provided in a form of a metallic wire. Alternatively, the clip 70 need not be made of metal. For example, the clip 70 may be made of resin.

In the above-described embodiment, the short-side direction is aligned with the conveying direction of the sheet S. However, the short-side direction may be a direction different from the conveying direction of the sheet S.

Parts and components employed in the above-described embodiment and modifications may be suitably selected and combined together.

What is claimed is:

1. An image forming apparatus fixing unit comprising:

a heater having a first surface and a second surface opposite each other, the heater comprising:

a base plate elongated in a long-side direction and having a thickness defining a thickness direction orthogonal to the long-side direction; and a resistance heating element provided on the base plate;

an endless belt circularly movable around the heater, the endless belt having an inner peripheral surface in contact with the first surface of the heater;

a holder supporting the heater, the holder having a supporting surface supporting the second surface of the heater;

a stay supporting the holder, the stay being positioned opposite the heater with respect to the holder in the thickness direction; and a clip nipping the holder and the stay to retain the holder on the stay, the clip having a first part overlapping with the heater when viewed in the thickness direction to restrict the heater supported by the holder from getting detached from the holder;

wherein the clip is configured as a metallic wire.

2. The image forming apparatus fixing unit according to claim 1, wherein the clip is provided at an end portion of the holder in the long-side direction.

3. The heating image forming apparatus fixing unit according to claim 1, wherein the endless belt extends in the long-side direction to cover a prescribed region of the holder and the stay in the long-side direction, and wherein the clip is positioned outside the prescribed region in the long-side direction.

4. The image forming apparatus fixing unit according to claim 1, wherein the clip has:

a first engaging part configured to engage the stay;

a second engaging part configured to engage the holder; and a first connecting part connecting the first engaging part to the second engaging part, and wherein the first part is connected to the second engaging part.

5. The image forming apparatus fixing unit according to claim 4, wherein the clip has:

a third engaging part configured to engage the stay at a position different from a position where the first engaging part engages the stay;

a fourth engaging part configured to engage the holder at a position different from a position where the second engaging part engages the holder; and a second connecting part connecting the third engaging part to the fourth engaging part, and wherein the first part is connected to both of the second engaging part and the fourth engaging part.

6. The image forming apparatus fixing unit according to claim 5, wherein the stay includes:

a first wall extending in the thickness direction and having one end and another end in the thickness direction, the one end of the first wall being in contact with the holder;

a second wall extending in the thickness direction and having one end and another end in the thickness direction, the one end of the second wall being in contact with the holder, the second wall being arranged to be spaced apart from the first wall in a short-side direction of the base plate which is orthogonal to both of the long-side direction and the thickness direction; and a third wall connecting the another end of the first wall and the another end of the second wall, wherein the first engaging part is engaged with the first wall, and wherein the third engaging part is engaged with the second wall.

7. The image forming apparatus fixing unit according to claim 6, wherein the stay has:

a first hole formed at the first wall, one end of the clip being engaged with the first hole; and a second hole formed at the second wall, another end of the clip being engaged with the second hole, and wherein, in a state where the one end of the clip is engaged with the first hole and the another end of the clip is engaged with the second hole, the clip is pivotally movable between an engaged state where the clip retains the holder on the stay and a disengaged state where the clip does not retain the holder on the stay.

8. The image forming apparatus fixing unit according to claim 5, wherein the holder has a groove extending in the long-side direction, the second engaging part being fitted in the groove.

9. The image forming apparatus fixing unit according to claim 1, wherein the supporting surface of the holder and the first part of the clip define a distance therebetween in the thickness direction that is greater than the thickness of the base plate.

10. The image forming apparatus fixing unit according to claim 1, wherein the holder has a first groove extending in a short-side direction of the base plate which is orthogonal to both of the long-side direction and the thickness direction, and wherein the first part of the clip is fitted in the first groove.

11. The image forming apparatus fixing unit according to claim 10, wherein the holder has a second groove extending in the long-side direction, and wherein the clip has an engaging part engaging the holder, the engaging part of the clip being fitted in the second groove.

12. An image forming apparatus fixing unit comprising:

a heater having a first surface and a second surface opposite each other, the heater comprising:

a base plate elongated in a long-side direction and having a thickness defining a thickness direction orthogonal to the long-side direction; and a resistance heating element provided on the base plate;

an endless belt circularly movable around the heater, the endless belt having an inner peripheral surface in contact with the first surface of the heater;

a holder supporting the heater, the holder having a supporting surface supporting the second surface of the heater;

a stay supporting the holder, the stay being positioned opposite the heater with respect to the holder in the thickness direction; and a clip nipping the holder and the stay to retain the holder on the stay, the clip having a first part overlapping with the heater when viewed in the thickness direction to restrict the heater supported by the holder from getting detached from the holder;

wherein the holder has a first groove extending in a short-side direction of the base plate which is orthogonal to both of the long-side direction and the thickness direction, and wherein the first part of the clip is fitted in the first groove.

13. The image forming apparatus fixing unit according to claim 12, wherein the holder has a second groove extending in the long-side direction, and wherein the clip has an engaging part engaging the holder, the engaging part of the clip being fitted in the second groove.

* * * * *